(No Model.) 3 Sheets—Sheet 1.
A. A. DE WITT.
AUTOMATIC LUBRICATOR.
No. 602,128. Patented Apr. 12, 1898.
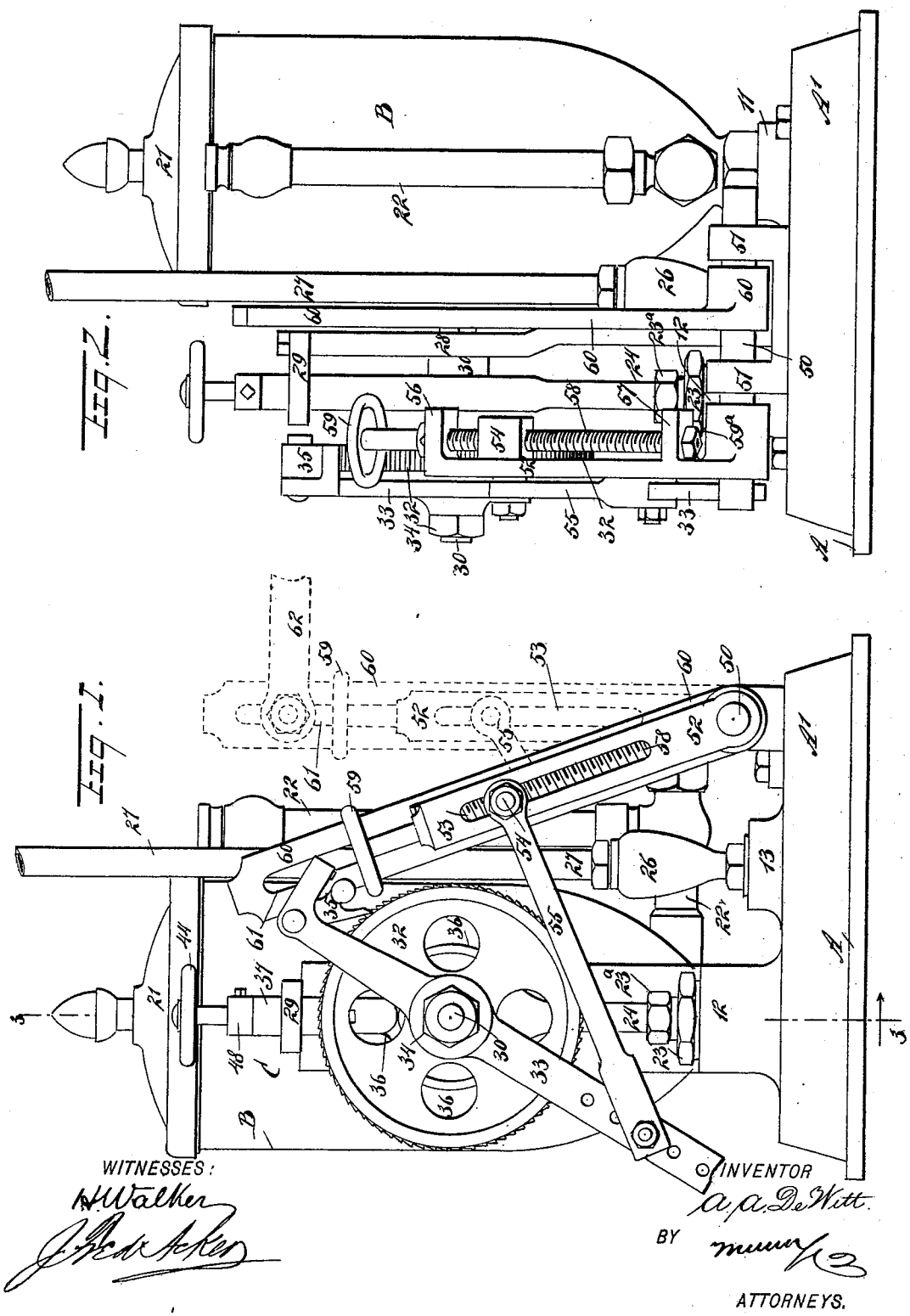
WITNESSES: INVENTOR
A. A. DeWitt.
BY
ATTORNEYS.

(No Model.) 3 Sheets—Sheet 2.

A. A. DE WITT.
AUTOMATIC LUBRICATOR.

No. 602,128. Patented Apr. 12, 1898.

WITNESSES:

INVENTOR
A. A. De Witt.
BY
ATTORNEYS.

(No Model.)  3 Sheets—Sheet 3.

A. A. DE WITT.
AUTOMATIC LUBRICATOR.

No. 602,128. Patented Apr. 12, 1898.

WITNESSES:
H Walker

INVENTOR
A. A. DeWitt.
BY
ATTORNEYS.

UNITED STATES PATENT OFFICE.

ALEXANDER A. DE WITT, OF NEW YORK, N. Y.

AUTOMATIC LUBRICATOR.

SPECIFICATION forming part of Letters Patent No. 602,128, dated April 12, 1898.

Application filed June 2, 1897. Serial No. 639,134. (No model.)

*To all whom it may concern:*

Be it known that I, ALEXANDER A. DE WITT, of New York city, in the county and State of New York, have invented a new and Improved Automatic Lubricator, of which the following is a full, clear, and exact description.

My invention relates to devices by means of which oil or other lubricating compounds are delivered or supplied to cylinders, pipes, chests, and bearings of engines and other machines and whereby liquid compounds are supplied to boilers.

The object of my invention is to provide an automatic lubricator which is adapted by its peculiar construction to be used on a greater range of machinery than others of its type, and which will increase the efficiency of such lubricators, and to provide for their more reliable and ready regulation.

Another object of the invention is to provide a regulating device by which the operator can govern the delivery of lubricating material to suit the needs of the machine designed to be lubricated.

Another object of the invention is to provide a lubricator which will furnish reliable lubrication with the least care or attention and at the least possible cost for lubricating products.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
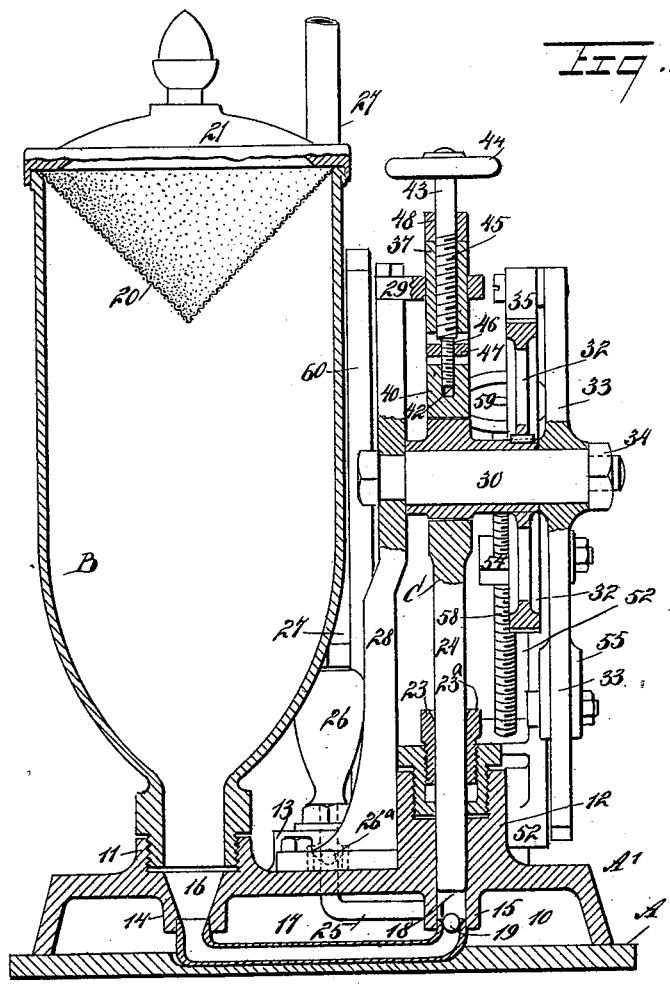
Figure 5:
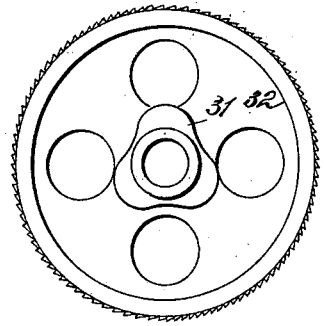
Figure 5:
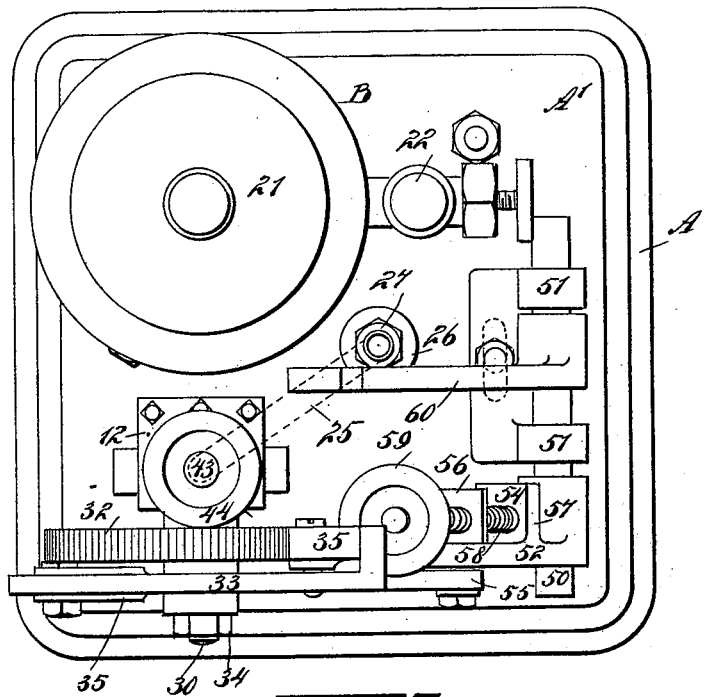
Figure 7:
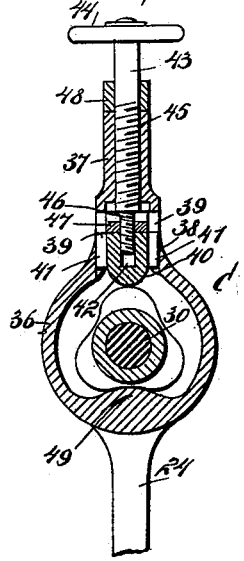

Figure 1 is a front elevation of the improved lubricator. Fig. 2 is a side elevation thereof. Fig. 3 is a vertical section on the line 3 3 of Fig. 1. Fig. 4 is a plan view. Fig. 5 is a detail view of a cam employed and the ratchet-wheel connected with the cam. Fig. 6 is a sectional view through a piston which operates in conjunction with the cam shown in Fig. 5; and Fig. 7 is a plan view of the upper striking-point of the cam, which is carried by the piston and is shown disconnected therefrom.

A bed A' is made to rest upon a plate A, the said bed being hollow, providing an inner chamber 10. The bed is further provided with three hubs upon its upper surface, designated, respectively, as 11, 12, and 13. Upon the under face of the bed below the hub 11 a lug 14 is formed, while a second lug 15 is similarly placed beneath the second hub 12. The hub 11 is tapped, and the bed at the bottom of the tapped portion of the hub is provided with a channel 16, preferably tapering, which extends through the lug 14. A reservoir B, adapted to hold a supply of oil or other lubricant, is screwed into or otherwise fastened to the hub 11. A pipe 17 is made to enter the channel 16 at the lower end of the lug 14, the said pipe 17 being carried to the lug 15 beneath the hub 12, which lug 15 is provided with a chamber 18, extending through it and continued up through the hub 12, as shown in Fig. 3. A valve 19, preferably a ball-valve, is located in the end of the pipe 17, partially within the chamber 18. The reservoir B is provided with a percolator 20, a cover 21, and a gage-glass 22. The hub 12 is provided with a stuffing-box 23 and a piston-carrier 23ª, receiving the rod 24 of a piston C, which rod extends downward likewise into the channel 18 and its continuation in the said hub 12. A pipe 25 is made to enter and pass through the hub 13, the said pipe being likewise made to enter the chamber in the lug 15 above the seating-point for the valve 19.

A bulb or a dome 26 is supported on the hub 13 and is connected with the aforesaid pipe 25, as shown in Fig. 3. This dome 26 forms a compression or air chamber from which a stand-pipe 27 is led for the purpose of conducting the oil to its point of delivery. At the bottom of the said compression or air chamber a valve 26ª, similar to the valve 19, is seated, as shown in dotted lines in Fig. 3, the valve 19 being shown in positive lines in the same figure.

A standard 28 is secured to the bed at one side of the reservoir B. The standard 28 is provided with a horizontal outwardly-extending member 29, and to this member, at or near its center, an outwardly-extending horizontal shaft or spindle 30 is secured. A three-winged or trefoil cam 31 is mounted to turn on the fixed spindle 30, the said spindle having likewise loosely mounted thereon a ratchet-wheel 32, said ratchet-wheel being preferably keyed to the hub of the cam. A ratchet-arm 33 is likewise loosely mounted on said spindle near its outer end, the arm extending beyond both sides of the spindle, and these parts are held on the spindle by a lock-nut 34. The upper end of the ratchet-arm is at an angle to the body, and at the junction of these two parts a dog 35 is pivoted, which will gravitate downward and engage with the teeth of the ratchet-wheel, the projection at the upper portion of the ratchet-arm limiting the upward movement of the same.

The piston C is shown particularly in Fig. 6, comprising the rod 24, heretofore mentioned, which serves as a plunger, and a ring-body 36, together with a neck 37. Between the neck 37 and the ring-body 36 an enlarged section 38 is formed, in communication with both of the aforesaid parts, and in this enlarged section 38 slideways 39 are produced at opposite sides. Within the enlarged section 38 of the piston a slide 40 is adapted to have movement and constitutes the upper striking-point for the cam 31. This slide or upper striking-point is provided with ribs 41 at opposite sides, adapted to enter the slideways or grooves 39 in the aforesaid enlarged portion of the piston, and the said slide or upper striking-point is provided at its upper portion with a tapped opening 42. A spindle 43 is located in the neck 37, the said spindle being provided with a reduced lower end, and the body portion of the spindle has a right-hand thread which engages with a similar thread in the neck, while the reduced and lower portion of the spindle has a left-hand thread and engages with a corresponding thread in the tapped portion 42 of the slide or upper striking-point 40. The lower end of this upper striking-point, which extends normally within the ring-body, is cylindrical, and at the upper end of the spindle 43 a wheel 44 is secured, whereby the said spindle is manipulated. The right-hand thread on the said spindle is designated as 45 and the left-hand thread as 46.

A collar 47 is attached to the reduced lower portion of the spindle 43, while a second collar 48 is secured to the said spindle above the neck 37. These two collars serve to limit the upward-and-downward movement of the spindle and obviate the unnecessary operation thereof. The ring-body of the piston is provided with an interior cylindrical convexed projection 49 at its bottom, adapted to fit between the wings of the cam 31, and this projection 49 serves as the lower striking-point for the said cam.

A rock-shaft 50 is journaled at one side of the bed in suitable bearings 51. A regulating-arm 52 is secured to the front end of the rock-shaft in any suitable or approved manner. This regulating-arm is provided with a vertical slot 53, (shown particularly in Fig. 1,) and a block 54 is held to slide in the said slot 53, the outer end of the said block being pivotally attached to a connecting-arm 55, which in its turn is adjustably and pivotally connected with the lower end of the ratchet-arm 33, as is also shown in Fig. 1. The regulating-arm is provided at the top with a horizontal extension 56 and near the bottom with a similar extension 57. These two extensions accommodate an adjusting-screw 58, which controls the regulation of the block 54, the screw passing through a threaded aperture in the said block. The upper end of the screw, or that portion which is beyond the upper part of the regulating-arm, is provided, preferably, with a hand-wheel 59 to facilitate the manipulation of the screw, and the screw is prevented from having end movement by means of a nut $59^a$, which is at its lower end. An operating-arm 60 is also secured to the rock-shaft 50, ordinarily between the supporting portions of the bearings 51. The operating-arm extends upward and is provided with a vertical slot 61, which is adapted to adjustably and pivotally receive a rod 62, which rod may be connected with any moving point on the machine to which the lubricator is attached, or can be driven by independent power, as required.

It will be observed that the lubricator may be connected with an engine having a long stroke, and by the three regulating-points—namely, the point of intersection of the connecting-arm 55 with the regulating-arm 52 and the connection of the said connecting-arm with the ratchet-arm, together with the throw of the dog with respect to the ratchet-wheel—the stroke can be controlled as desired. In addition to the controlling-points above mentioned the stroke may be regulated at the piston by means of the adjustment of the spindle 43 with respect to the cam 31.

By reason of the right-hand and left-hand threads being employed on the spindle 43 a better adjustment is obtained than if a continuous thread of the same character were used.

The principal points of the improvement consist of the piston C and cam 31 or a similar cam, by means of which I am enabled to control the amount of oil delivered per stroke. The cam 31 having three wings gives three strokes of the piston to one revolution of the ratchet-wheel 32, the length of the stroke being governed principally by the upper striking-point 40, raised or lowered by the spindle 43. It is obvious also that this movement enables the operator to shut off the delivery as well as to regulate it. By having a right and left hand thread on the spindle 43 less action is required to accomplish the regulation of the fluid. The delivery is uniform, as the strokes of the piston are governed by the complete revolution of the ratchet-wheel 32, and there being three strokes to every revolution of the ratchet-wheel a less quantity of fluid is necessary to be discharged at each stroke. By means of the regulating-arm 60 I am enabled to change the length of travel of the dog 35, by which the number of teeth passed by the dog at each stroke is increased or decreased, thereby increasing or decreasing the frequency of the strokes of the piston, the regulation being possible while the machine is in operation.

The regulating-arm 52 and operating-arm 60 are preferably secured to the shaft 50 by set-screws or their equivalents, and by reason of this construction I am enabled to place the lubricator at any angle to the point at which connection is to be made with the machine—that is, I am enabled to change the angle of the operating-arm 60 or carry it to such a position as to bring the connecting-rod 55 at a safe and proper angle to insure free, easy, and reliable movement, avoiding intermediate movements.

By reason of the general construction of the lubricator I am enabled to attach it to machines running at any rate of speed and regulate the quantity of oil delivered to any point required. The compression or air chamber in the dome 26 permits a regulation of the flow of oil from it to such an extent that oil may be delivered in given quantities at two or more points regularly and positively, and said construction likewise relieves the supply-pipes of a sudden shock or possible fracture, which might result in the event of closing the point of delivery. The compression or air chamber may be placed at the top of the standpipe 27 or at its bottom.

It will be observed from the above description of the invention that the device is susceptible of modifications without material departure from the principles and spirit of the invention, and for this reason I do not wish to be understood as limiting myself to the precise form of the parts herein set forth.

It is the aim of the invention to produce a lubricating device in which are combined the elements of regularity, economy, positive feed, adaptability, regulation while in motion, and a safeguard against undue pressure.

Having thus described my invention, I claim as new and desire to secure by Letters Patent—

1. A lubricator, comprising a pump, the rod whereof has two tappets or striking-points thereon, one of which is movable relative to the other, an actuating-cam revolving between the striking-points and a threaded rod mounted longitudinally upon the piston-rod and engaging the adjustable striking-point to move it.

2. In a lubricator, a pump the piston whereof consists of a rod, a ring-body and a neck, the body of the piston having a fixed lower striking-point, an upper striking-point, adjustable to and from the fixed striking-point, an adjusting-screw located in the neck and controlling the movement of the adjustable striking-point, a winged cam held to revolve in the ring-body and arranged for engagement with the two striking-points, and means for imparting rotary movement to the cam, as specified.

3. In a lubricator, the combination, with a pump and its piston, the piston consisting of a rod, a ring-body and a neck, the ring-body being provided with a fixed striking-point and a second striking-point adjustable to and from the fixed striking-point, and an adjusting-screw having a right and a left hand thread, one thread engaging with a corresponding thread in the neck of the piston and the other thread entering the adjustable striking-point, of a winged cam held to revolve in the ring-body of the piston, the cam being arranged for engagement with the two striking-points, an actuating device for the cam, a regulating device controlling the actuating mechanism, a motor, and means for operating the regulating device from said motor.

4. In a lubricator, the combination, with a pump and its piston, the piston comprising a rod, a ring-body and a neck, the body being provided with a fixed striking-point and an adjustable striking-point, and a winged cam held to revolve within the ring-body between the two striking-points, of a ratchet connected with said cam, an arm carrying a dog, arranged to move the said ratchet, a regulating-arm, an arm connecting with the ratchet-arm and adjustably connected with the regulating-arm, a shaft carrying the regulating-arm, and an operating-arm arranged for connection with a motor, attached to the said shaft, for the purpose specified.

5. In a lubricator, the combination, with a pump and its piston, the piston consisting of a rod, a ring-body and a neck, the ring-body being provided with a fixed striking-point and a movable striking-point, an adjusting-screw held to turn in the neck, having a right and left hand thread, one of the threaded surfaces engaging with the adjustable point, and a winged cam held to revolve between the striking-points of the piston, of a ratchet-wheel connected with the cam, an arm provided with a dog, engaging with the teeth of the ratchet-wheel connected with the cam, a shaft, a regulating-arm connected with the said shaft, and a connecting-rod adjustably attached to the arm carrying the dog and to the regulating-arm, an operating-arm connected with the said shaft, and means, substantially as described, for effecting an adjustable connection between the operating-arm and a motor, for the purpose set forth.

ALEXANDER A. DE WITT.

Witnesses:
J. FRED. ACKER,
JNO. M. RITTER.